No. 625,686. Patented May 23, 1899.
J. G. KEITH.
ROLLER BEARING.
(Application filed Feb. 17, 1897. Renewed Apr. 22, 1899.)
(No Model.) 2 Sheets—Sheet 1.
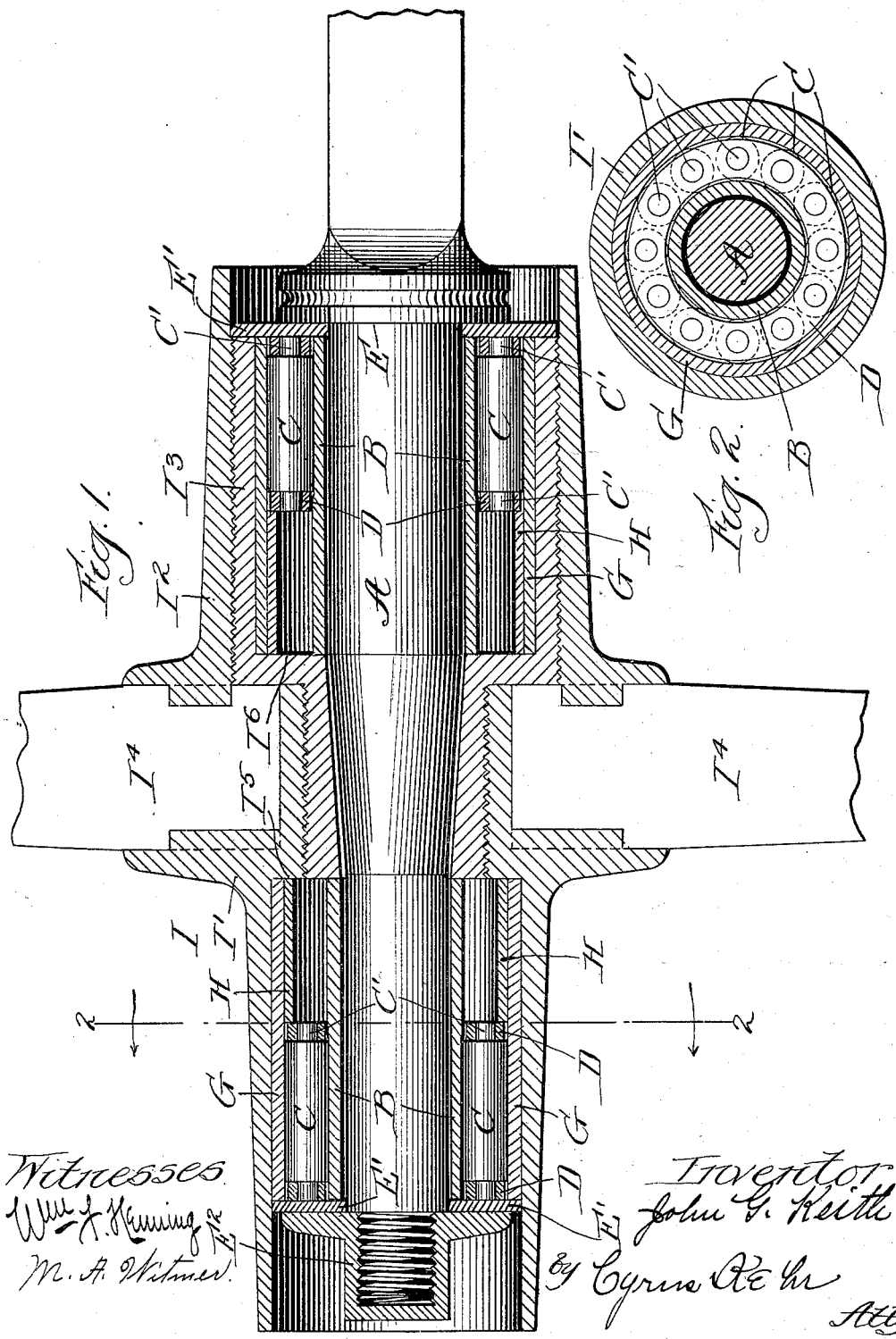

No. 625,686. Patented May 23, 1899.
J. G. KEITH.
ROLLER BEARING.
(Application filed Feb. 17, 1897. Renewed Apr. 22, 1899.)
(No Model.) 2 Sheets—Sheet 2.
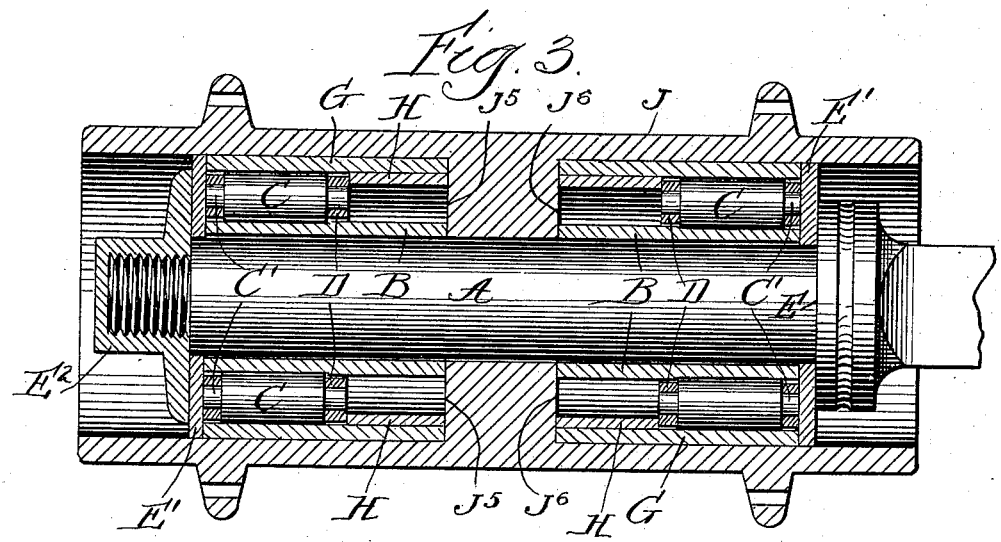
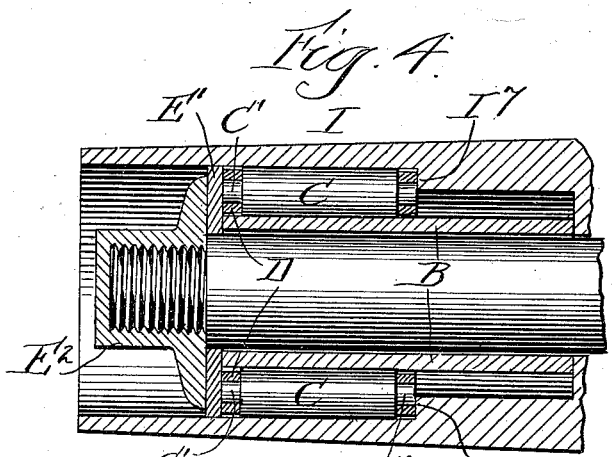
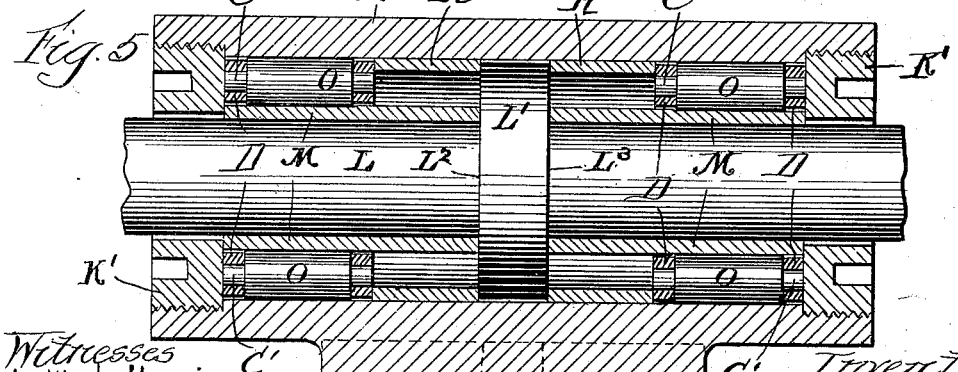
Witnesses
Inventor
John G. Keith
by Cyrus Kehr Atty.

UNITED STATES PATENT OFFICE.

JOHN G. KEITH, OF CHICAGO, ILLINOIS.

ROLLER-BEARING.

SPECIFICATION forming part of Letters Patent No. 625,686, dated May 23, 1899.

Application filed February 17, 1897. Renewed April 22, 1899. Serial No. 714,098. (No model.)

*To all whom it may concern:*

Be it known that I, JOHN G. KEITH, a citizen of the United States, residing at Chicago, in the county of Cook and State of Illinois, have invented certain new and useful Improvements in Roller-Bearings; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates particularly to roller-bearings for wheels to be used on vehicles.

It is also applicable to various kinds of machinery.

It is an improvement on the construction described and illustrated in Letters Patent of the United States No. 531,618, granted to me December 25, 1894.

In the accompanying drawings, Figure 1 is a central section parallel to the axis of a hub and axle embodying my improvement. Fig. 2 is a section on the line 2 2 of Fig. 1, looking in the direction of the arrows. Fig. 3 is a central section parallel to the axis of a hub differing in form from that shown in Fig. 1. Fig. 4 is a sectional detail of the interior of the hub. Fig. 5 is a central longitudinal section of the modification.

Referring to Figs. 1, 2, and 3 of said drawings, A is an axle or shaft.

B B are cylindric shells or sleeves surrounding the shaft or axle A, preferably so loosely that said shells may rotate upon said shaft if power is applied thereto tending to cause said rotation. The outer surfaces of these sleeves form the ways or tracks for the rollers, and said ways or tracks should be of hardened metal. For the sake of durability and strength the axle or shaft A should be of relatively soft metal. By the use of these sleeves the latter may be hardened or tempered, as may be desired, to afford proper surface for the rollers, while the shaft A may be tempered for strength and durability. If the said sleeves are made rotatable upon the shaft A, the bearing may remain operative in case the rollers become inoperative through cramping or breaking or other derangement, the action of the bearing then being like that of the ordinary bearings in which rollers are not used.

C C are the rollers. These surround the periphery of the sleeves B over one end of the latter, the length of each roller being approximately one-half the length of the sleeve, to the end that one half of said sleeve may remain unused and unworn until the other end has been worn to such an extent as to require change. The sleeve may then be removed and reversed, so that a new track is provided for the rollers. One end of said sleeve may be made a trifle thicker than the other and said thicker end reserved for second use, so that if the rollers are slightly worn the additional thickness of the shell will compensate for the reduced thickness of the rollers and cause a close fit.

D D are rings loosely surrounding the sleeves B and receiving journals C' on the ends of the rollers C, whereby said rollers are separated and held parallel to each other. Any suitable shoulder E, washer E', or nut $E^2$ may be applied at one side of the rollers and sleeve B to keep the latter from endwise movement in the direction of such shoulder.

I is a hub composed of the parts I', $I^2$, and $I^3$, threaded into each other and embracing spokes $I^4$, as described in my said Letters Patent No. 531,618, the parts I' and $I^3$ being contracted at the middle of the hub, so as to form annular shoulders $I^5$ and $I^6$ around and adjacent to the shaft A. The shells or sleeves B bear by their inner ends against said shoulders $I^5$ and $I^6$. The peripheries of the rollers C may bear directly against the interior faces of the hub; but, if so desired, a sleeve G may be placed within the hub and around said rollers, so that the latter will travel upon the interior face of said sleeve. Said sleeves G may be made as long as the sleeves B in order that they may also be reversed to present new surfaces to the rollers.

A sleeve H may surround the sleeve B between the innermost ring D and the adjacent shoulder $I^5$ or $I^6$ and serve to keep said ring D and rollers C from moving in a direction parallel to the axis of the hub and toward said shoulder. In the absence of the sleeve G a shoulder $I^7$ on the interior of the hub, Fig. 4, may be substituted for the sleeve H.

In Fig. 3 the hub J is a single piece having on its interior the annular shoulders $J^5$ and $J^6$ to meet the inner ends of the sleeve B.

The hub may obviously be a stationary bearing, while the shaft or axle is made rotary.

In Fig. 5 the interior of the hub K is plain from one end to the other, and in lieu of the contracted portion of the hub having the shoulders $I^5$ and $I^6$ there is placed upon the shaft L an annular collar L', having annular shoulders $L^2$ $L^3$, against which the ends of the sleeves M rest, and at each end of the hub a nut K' is threaded into the interior of the hub to keep the rollers O and their adjuncts in place. The bearing formed by the ends of the sleeves M against said shoulders $L^2$ $L^3$ prevents the hub from moving lengthwise upon the shaft L.

I claim as my invention—

1. The combination with a shaft and hub and an annular shoulder within said hub, of sleeves, B, loosely surrounding said shaft, rollers, C, surrounding said sleeves and approximately half as long as said sleeves, and rings, D, in which said rollers are journaled, and means for keeping said sleeves, rings and rollers in place, substantially as described.

2. The combination with a shaft and hub and an annular shoulder within said hub, of sleeves, B, surrounding said shaft, sleeves, G, surrounding said sleeves, B, rings, D, located between the sleeves, B and G, rollers, C, having bearings in said rings and being approximately half as long as said sleeves, B and G, and means for keeping said rings and rollers in place, substantially as described.

3. The combination with the shaft, A, hub and annular shoulder located with said hub, of sleeves, B, G, and H, rings, D, and rollers, C, said rollers being approximately half as long as said sleeves, B and G, and suitable means for keeping said sleeves, rings and rollers in place, substantially as described.

4. The combination of the shaft, hub, sleeves, surrounding said shaft, rings, surrounding said sleeves, rollers, approximately half as long as said sleeves, and journaled in said rings, and means for keeping said shaft, hub, sleeves, rings, and rollers relatively in position, substantially as described.

5. The combination with the shaft, A, and hub consisting of the portions, I', $I^2$ and $I^3$, and having shoulders, $I^5$ and $I^6$, of sleeves, B, rings, D, and rollers, C, journaled in said rings and being approximately half as long as said sleeves, and means for keeping said rings and rollers in place, substantially as described.

In testimony whereof I affix my signature, in presence of two witnesses, this 6th day of February, 1897.

JOHN G. KEITH.

Witnesses:
ARTHUR B. PEASE,
CYRUS KEHR.